(12) United States Patent
Kim

(10) Patent No.: US 8,788,158 B2
(45) Date of Patent: Jul. 22, 2014

(54) SHIFTING DEVICE FOR VEHICLE AND SHIFTING SYSTEM USING THE SAME

(75) Inventor: Hee Seok Kim, Sterling Heights, MI (US)

(73) Assignees: SL Corporation, Daegu (KR); SL America, Sterling Heights, MI (US)

( * ) Notice: Subject to any disclaimer, the term of this patent is extended or adjusted under 35 U.S.C. 154(b) by 0 days.

(21) Appl. No.: 13/492,201

(22) Filed: Jun. 8, 2012

(65) Prior Publication Data

US 2012/0330518 A1 Dec. 27, 2012

Related U.S. Application Data

(60) Provisional application No. 61/499,504, filed on Jun. 21, 2011.

(51) Int. Cl.

| | |
|---|---|
| *B60K 17/06* | (2006.01) |
| *B60K 17/12* | (2006.01) |
| *F16H 59/08* | (2006.01) |
| *F16H 61/32* | (2006.01) |
| *F16H 59/10* | (2006.01) |
| *F16H 59/12* | (2006.01) |

(52) U.S. Cl.
CPC .......... *F16H 59/08* (2013.01); *F16H 2059/081* (2013.01); *F16H 2061/326* (2013.01); *F16H 59/105* (2013.01); *F16H 59/12* (2013.01)
USPC ......................................... 701/51; 74/473.12

(58) Field of Classification Search
CPC . F16H 61/0213; B60W 10/10; B60W 10/105; B60K 41/142

USPC ................ 701/36, 51, 53; 74/473.15, 473.12, 74/473.14, 473.18, 473.3, 473.19, 473.25; 192/219.4, 220.4

See application file for complete search history.

(56) References Cited

U.S. PATENT DOCUMENTS

| | | | | |
|---|---|---|---|---|
| 5,161,422 | A * | 11/1992 | Suman et al. | 74/335 |
| 5,852,953 | A * | 12/1998 | Ersoy | 74/473.12 |
| 6,016,717 | A * | 1/2000 | Wheeler | 74/473.12 |
| 6,196,078 | B1 * | 3/2001 | DeJonge et al. | 74/473.12 |
| 6,484,598 | B2 * | 11/2002 | Peter | 74/335 |
| 6,918,314 | B2 * | 7/2005 | Wang | 74/335 |
| 2002/0000134 | A1 * | 1/2002 | Yamamoto et al. | 74/335 |
| 2005/0139031 | A1 * | 6/2005 | Giefer et al. | 74/473.15 |
| 2005/0239596 | A1 * | 10/2005 | Giefer et al. | 477/96 |
| 2006/0151231 | A1 * | 7/2006 | Bucksch et al. | 180/337 |
| 2010/0318268 | A1 * | 12/2010 | Jager et al. | 701/54 |
| 2011/0067515 | A1 * | 3/2011 | Rake et al. | 74/473.3 |
| 2011/0132121 | A1 * | 6/2011 | Park et al. | 74/473.12 |

* cited by examiner

*Primary Examiner* — Mary Cheung
*Assistant Examiner* — Rodney Butler
(74) *Attorney, Agent, or Firm* — Edwards Wildman Palmer LLP

(57) ABSTRACT

A shifting device for a vehicle and a shifting system using the same are provided. The shifting device for a vehicle may be connected to a transmission of the vehicle via a cable to operate the transmission. More specifically, the shifting device may include an interface module which receives an input of a shift signal, and an actuator which is connected to one end of the cable, and operates the cable according to the shift signal inputted to the interface module to operate the transmission connected to the other end of the cable.

5 Claims, 10 Drawing Sheets

SHIFTING DEVICE FOR VEHICLE AND SHIFTING SYSTEM USING THE SAME

CROSS-REFERENCE TO RELATED APPLICATION

This application claims priority from U.S. Provisional Patent Application No. 61/499,504 filed on Jun. 21, 2011 in the United States Patent and Trademark Office, and all the benefits accruing therefrom under 35 U.S.C. 119, the contents of which in its entirety are herein incorporated by reference.

BACKGROUND

1. Field of the Invention

The present invention relates to a shifting device for a vehicle and a shifting system using the same, and more particularly to a shifting device for a vehicle including an actuator which moves a cable connected to the shifting device operating according to a shift signal to operate a transmission of the vehicle, and a shifting system using the same.

2. Description of the Related Art

A transmission in a vehicle typically varies a gear ratio in order to maintain a constant rotation of an engine according to the speed of the vehicle. This change in gear ration, particularly in standard transmissions, is often controlled by a driver that operates a shifting device such as a shift lever in order to change the gear ratio of the transmission or by the transmission in an automatic or tiptronic transmission.

Recently, an electronic shifting device such as a shift-by-wire shifting device are starting to be mounted within the vehicle to receive a signal according to the driver's operation on the shift lever and control the transmission using an electrical signal unlike a conventional shifting device in which a shift lever operating force of the driver is transmitted to the transmission through a mechanical cable.

Specifically, the conventional shifting device is configured so that a lever is rotated by operating a knob to shift the gear of the transmission through a cable connected to the lever, and a mechanical cable shifting structure is formed between the transmission and the shifting device. In the mechanical cable shifting structure, a shift feeling that the driver experiences during the shifting depends on the route of the cable and the transmission, thus it is often difficult for the driver to perceive a smooth shifting feeling. Further, the size of a gate where a gear shifting range is disposed varies according to the stroke of the transmission, and the lever occupies a large area of a center console. Accordingly, it is difficult to install various switches and convenient products such as a cup holder due to the amount of space the shifting lever takes up.

More recent shifting devices, such as the electrical devices described above, are configured so that after a change in position of the lever is sensed, an electrical signal is transmitted from an electronic control unit (ECU) to a transmission control unit (TCU), and the TCU determines other conditions of the vehicle at the same time and shifts a gear stage of the transmission by using an actuator assembled to the transmission. In this case, since the shifting is performed by using an electrical signal, the mechanical cable structure can be omitted, and it is possible to achieve a smooth shift feeling and minimize the size of the gate. However, since this system communicates over a controller area network (CAN) with the TCU of the vehicle, vehicle safety-related requirements would increase and a procedure for verifying safety then becomes quite complicated, thereby causing an increase in production costs of the vehicle.

Thus, there is a need for development of a new shifting device having advantages of both the conventional mechanical cable shifting structure and the more recent electrical shifting structure using an electrical signal while at the same time excluding their disadvantages.

SUMMARY OF THE DISCLOSURE

The exemplary embodiment of the present invention provides a shifting device for a vehicle, which is mechanically connected to a transmission through a cable connected to an actuator of the shifting device. More specifically, the actuator receives a shift signal in the gear shift and shifts the gear of the transmission through the cable, and a shifting system using the same.

The exemplary embodiment of the present invention also provides a shifting device for a vehicle, where communication of the shift signal is made only in the shifting device, and a shifting system using the same The objects of the present invention are not limited thereto, and the other objects of the present invention will be described in or be apparent from the following description of the embodiments.

According to an aspect of the present invention, there is provided a shifting device for a vehicle, which is connected to a transmission of the vehicle via a cable to operate the transmission. In particular, the shifting device may include an interface module which receives an input of a shift signal; and an actuator which is connected to one end of the cable, and operates the cable according to the shift signal inputted to the interface module to operate the transmission connected to the other end of the cable.

According to another aspect of the present invention, there is provided a shifting system for a vehicle. More specifically, the system includes a shifting device on which an operation for gear shift of the vehicle is performed; a transmission which shifts a gear of the vehicle via operation through the shifting device; and a cable connecting the shifting device with the transmission. The shifting device reciprocates the cable based on a shift signal generated according to a gear shift input to drive the transmission.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE DISCLOSURE

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present invention will be described in detail with reference to the accompanying drawings.

Figure 1:
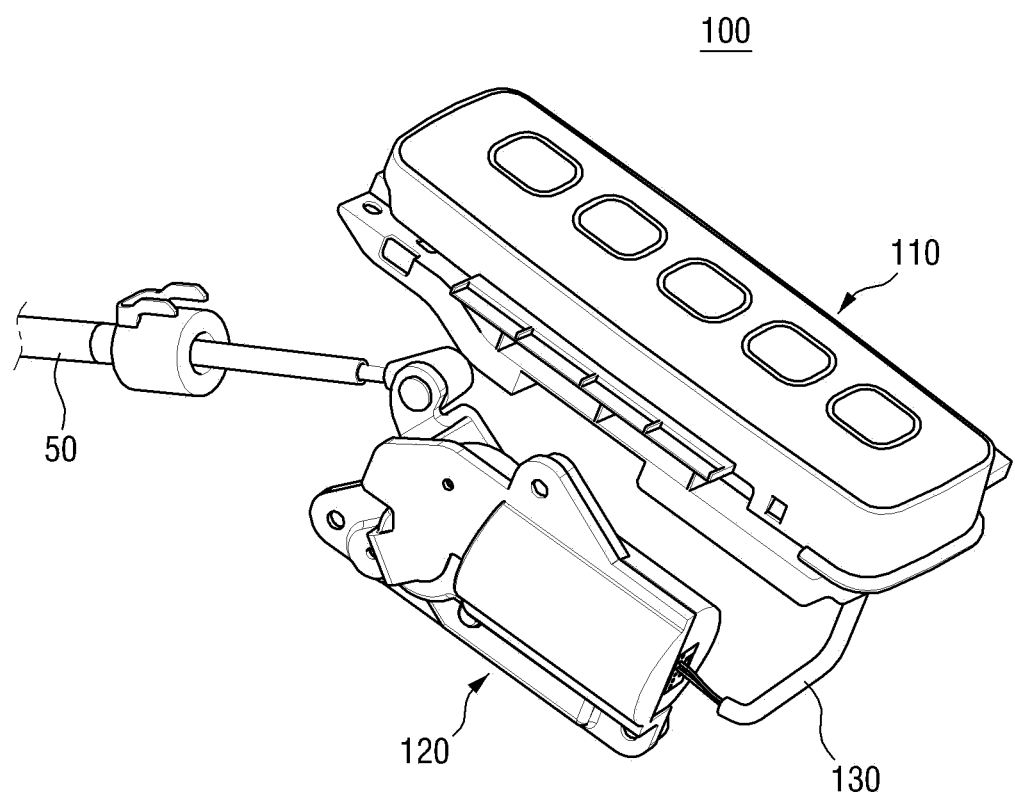
FIG. 1 is a perspective view of a shifting device for a vehicle in accordance with an exemplary embodiment of the present invention.
Figure 2A:
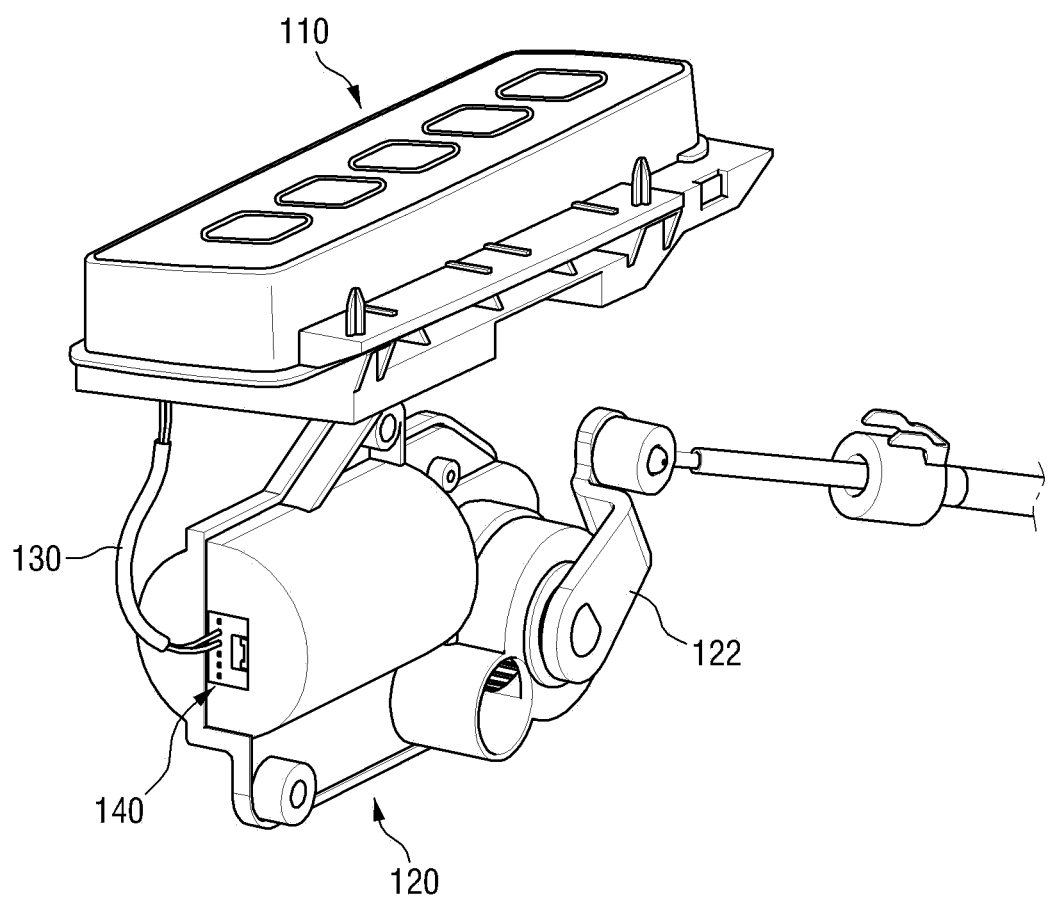
FIGS. 2A to 2C are perspective views of the shifting device for a vehicle, to which various types of input interfaces are applied, in accordance with the exemplary embodiment of the present invention.
Figure 2B:
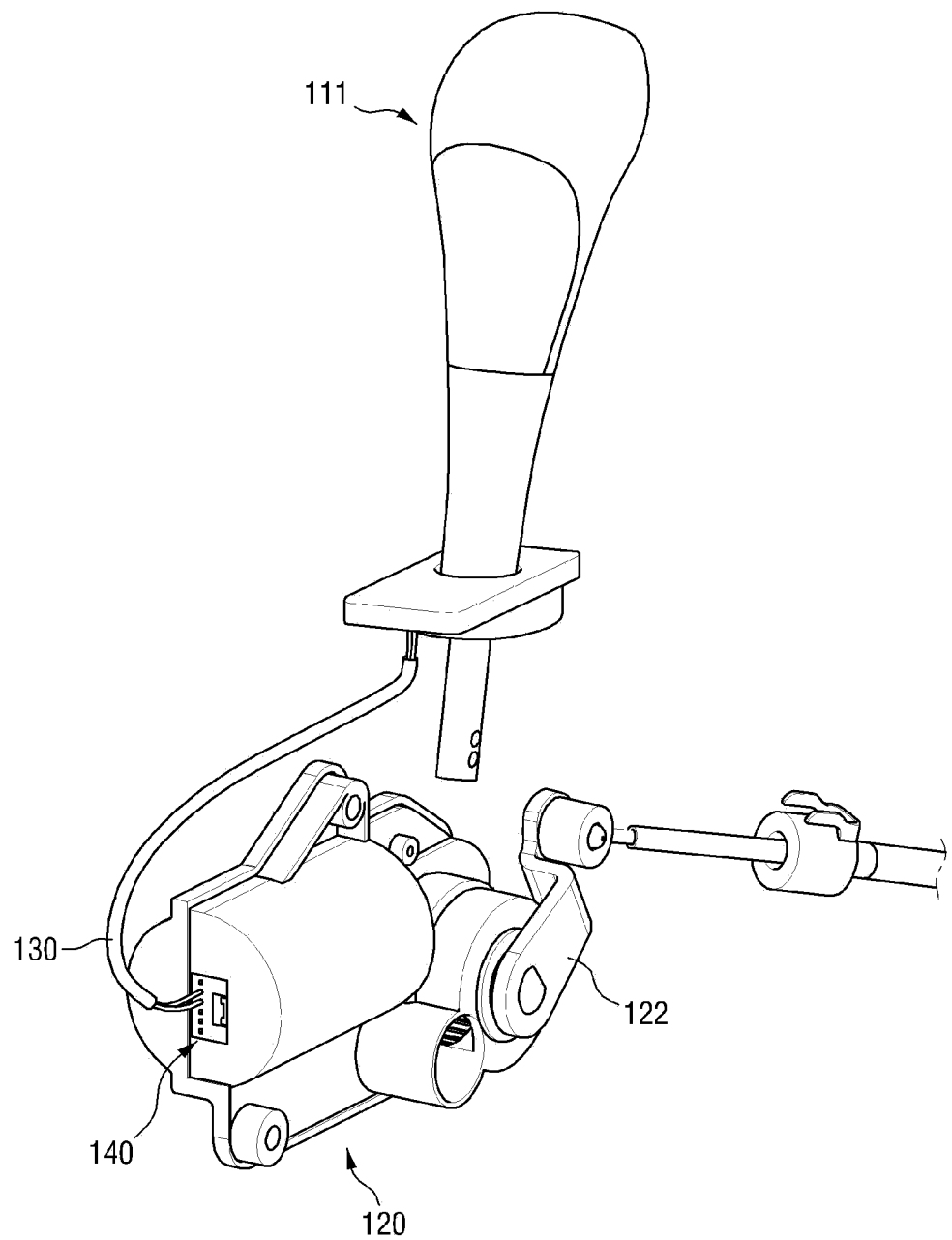
Figure 2C:
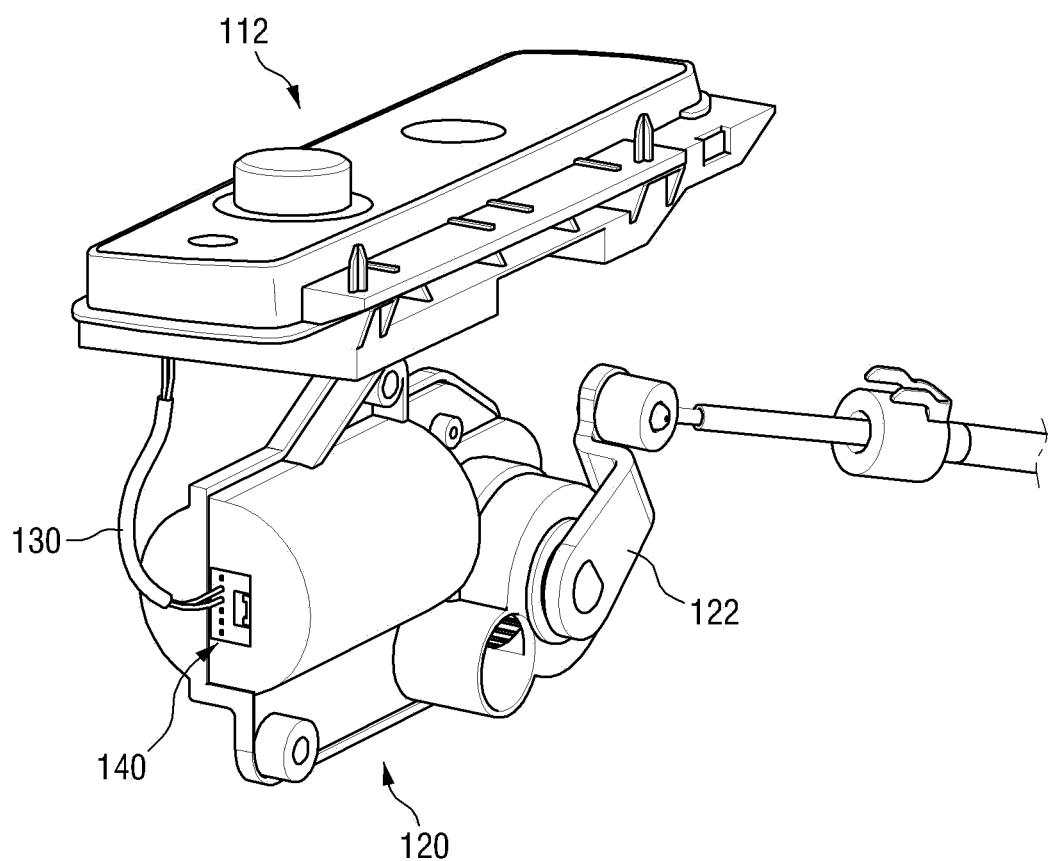

FIG. 1 is a perspective view of a shifting device for a vehicle in accordance with an exemplary embodiment of the present invention. FIGS. 2A to 2C are perspective views of the shifting device for a vehicle, to which various types of input interfaces are applied, in accordance with the exemplary embodiment of the present invention.

A shifting device for a vehicle (hereinafter, referred to as "shifting device") 100 is a device which is connected to a transmission 200 of the vehicle via a cable 50 to operate the transmission 200. Here, the transmission 200 may include a plurality of gear stages such as a park (P) stage, a neutral (N) stage, a drive (D) stage and a reverse (R) stage, but it will be apparent to those skilled in the art that the present invention is not limited thereto.

Referring to FIGS. 1 and 2A, the shifting device 100 may include an interface module 110, an actuator 120, a communication line 130 and a connector 140. The interface module 110 is a module to which a shift signal is inputted by a driver of the vehicle. Generally, the interface module 110 has an input range of park (P), reverse (R), neutral (N), drive (D), second gear (2) and first gear (L), and the input range is displayed in a gate area of a center console. Not to mention that the displayed input range may have various modifications and arrangements according to the shape of the gate or shift mode (e.g., automatic mode, manual mode and sports mode).

Further, the interface module 110 may be formed of various types. Referring to FIGS. 2A to 2C, interface modules 110, 111 and 112 may include a button type interface module 110, a knob type interface module 111, a dial type interface module 112, etc. Additionally, the exemplary embodiment of the present invention may be applied to other types of interface modules. Although the embodiment of the present invention will be described using the button type interface module 110, it will be apparent to those skilled in the art that the present invention is not limited thereto.

The actuator 120 is connected to one end of the cable 50, and actuates the cable 50 according to the shift signal inputted through the interface module 110, 111 or 112 to operate the transmission 200 connected to the other end of the cable 50. That is, the actuator 120 is mounted on the shifting device 100 rather than the transmission 200.

That is, in a conventional mechanical shift structure of the actuator 120 that moves the cable 150 is disposed within the transmission 200. Additionally, in an electronic shift structure the actuator 120 is operated by an electrical signal from the interface module 110, 111 or 112. The actuator 120 in any of these embodiments may be implemented using a motor, electromagnet solenoid, or the like.

The shifting device 100 and the transmission 200 may have a mechanical cable connection structure, as illustrated in FIG. 1. However, the cable 50 is connected to the actuator 120 of the shifting device 100 rather than the transmission 200. As a result the driver is not able to perceive a smooth shifting feeling while at the same time avoiding feeling vibrations from external factors related to the transmission. Further, since the cable 50 is located between the actuator 120 and the transmission 200, the route of the cable 50 can be freely set. Further, although the transmission 200 has a long stroke, the actuator 120 may be operated to compensate for the long stroke. Accordingly, it is possible to minimize the size of the gate where the interface module 110, 111 or 112 is disposed, and ambient convenient products can be easily installed therein. For example, in P-R shift, when the knob type interface module 111 that allows the actuator 120 to operate over a distance of about 5 mm, the actuator 120 allows the cable 50 to operate over a distance of about 20 mm, thereby minimizing the size of the gate.

Further, the actuator 120 may include an actuator arm 122. The cable 50 may be connected to the actuator arm 122, and the cable 50 may be moved according to the operation of the actuator arm 122. The operation of the actuator 120 will be described in detail later.

The communication line 130 may provide a connection between the interface module 110 and the actuator 120 to transmit/receive a shift signal from the interface module 110. That is, when the driver shifts gears, the shift signal is transmitted from the interface module 110 to the actuator 120 through the communication line 130. Since communication is made only between the interface module 110 and the actuator 120 and no communication is made between the shifting device 100 and a transmission control unit (TCU) (not shown) of the vehicle, a vehicle communication system or the like is as a result simplified.

The connector 140 may serve to connect the communication line 130 with the interface module 110 or the actuator 120. The connector 140 may be connected to only one end of the communication line 130, or both ends of the communication line 130. Generally, if one end of the communication line 130 is connected integrally with at least one of the interface module 110 and the actuator 120, the other end of the communication line 130 is connected to the connector 140, but the present invention is not limited thereto.

Figure 3:
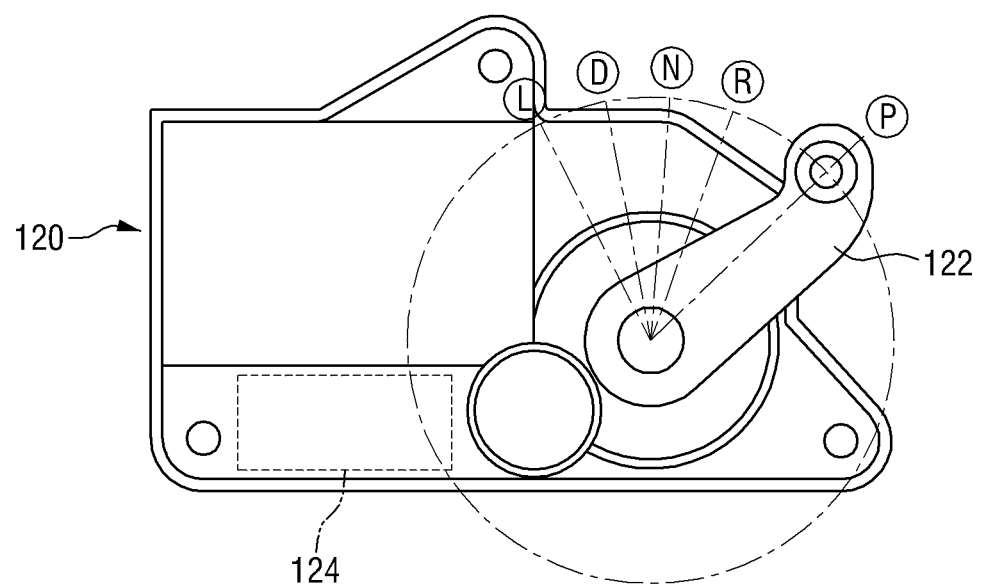
FIG. 3 illustrates a structure of the actuator of the shifting device for a vehicle in accordance with the exemplary embodiment of the present invention.
Figure 4:
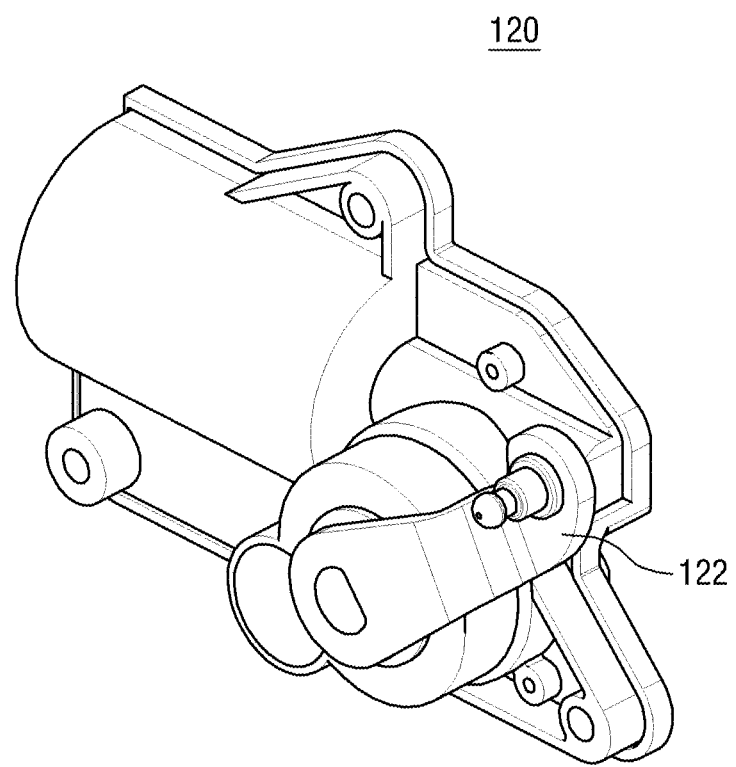
FIG. 4 is a perspective view of the actuator of the shifting device for a vehicle in accordance with the exemplary embodiment of the present invention.
Figure 5A:
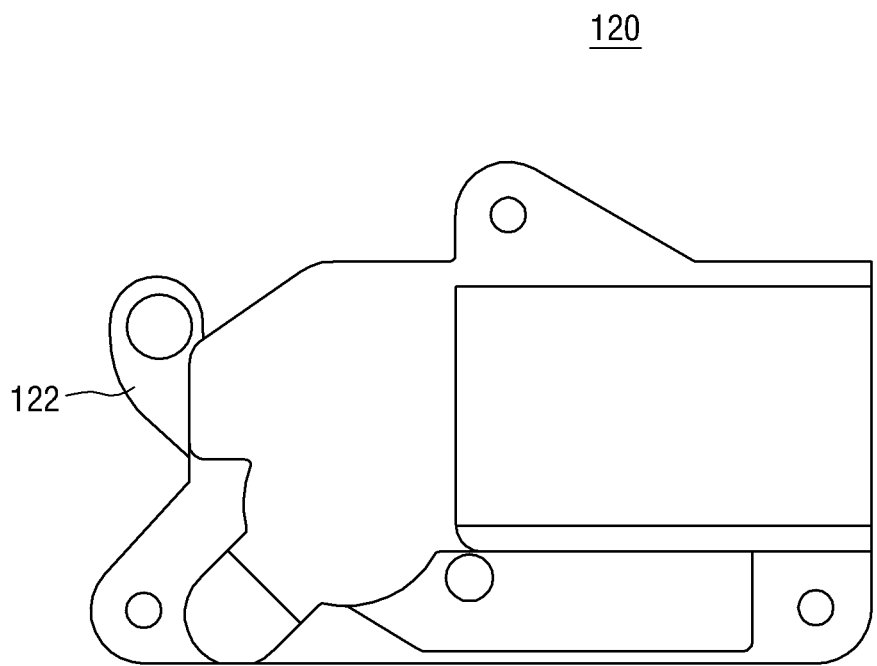
FIGS. 5A to 5C are cross-sectional views of the actuator of the shifting device for a vehicle, which are taken from three directions, in accordance with the exemplary embodiment of the present invention.
Figure 5B:
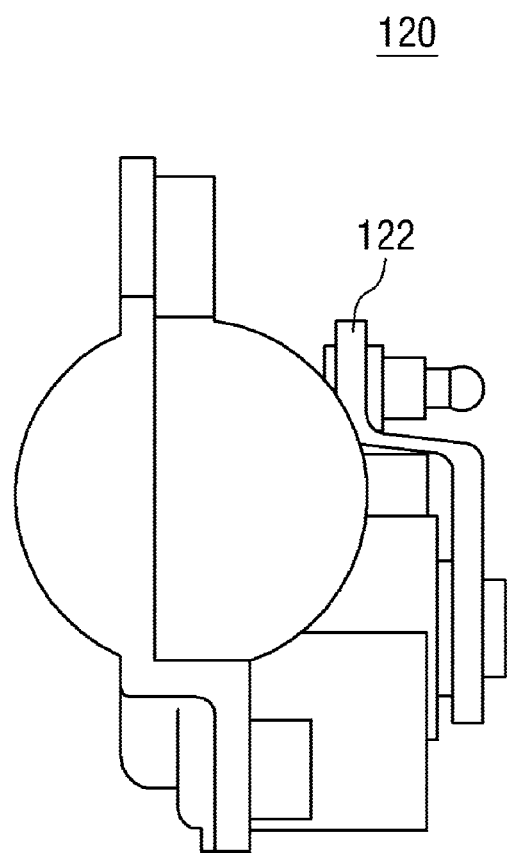
Figure 5C:
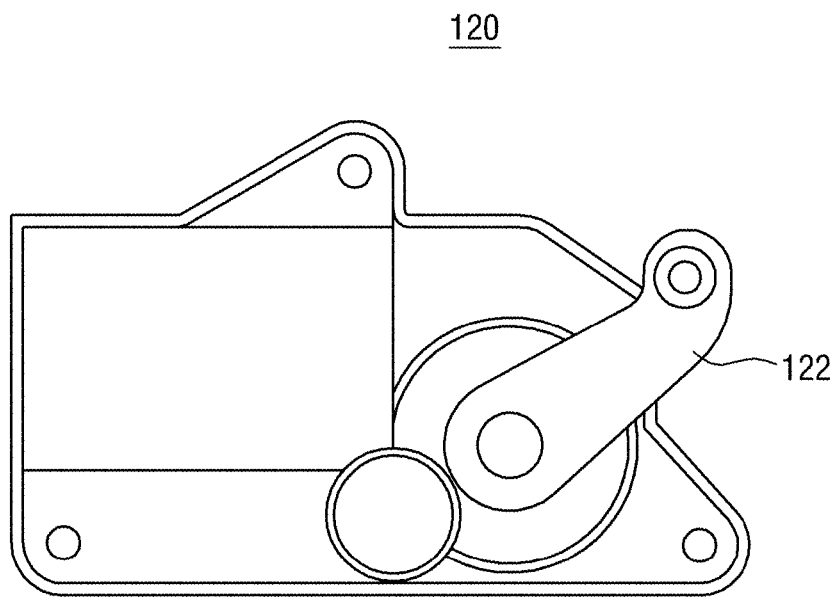

FIG. 3 illustrates an exemplary embodiment of a structure of the actuator of the shifting device for a vehicle in accordance with the embodiment of the present invention. FIG. 4 is a perspective view of the actuator of the shifting device for a vehicle in accordance with the embodiment of the present invention. FIGS. 5A to 5C are cross-sectional views of the actuator of the shifting device for a vehicle, which are taken from three directions, in accordance with the embodiment of the present invention.

Referring to FIG. 3, the actuator 120 may include the actuator arm 122 and a printed circuit board (PCB) 124. The actuator arm 122 is rotated by a driving force provided from the actuator 120. The cable 50 connected to the actuator arm 122 is moved according to the rotation of the actuator arm 122. For example, when a motor (not shown) provided in the actuator 120 is driven, the actuator arm 122 connected to a rotation shaft being rotated by the motor may be rotated.

Further, the actuator arm 122 may perform switching rotation to be rotated clockwise (from the L stage to the P stage) or counterclockwise (from the P stage to the L stage) according to the shift signal. Here, the rotation range of the actuator arm 122 may be set appropriately according to the input range of the gear shift.

Further, the actuator arm 122 may have a variable length. For example, the length of the arm may be varied by adopting a structure in which the length of the actuator arm 122 is extended and shortened. Alternatively, the actuator arm 122 may be attached/detached to/from the actuator 120 and the length of the arm may be varied by exchanging different actuator arms 122. By adjusting the length of the actuator arm 122, the travel of the transmission 200 can be adjusted. Accordingly, the actuator 120 may be applied in common to cable type transmissions 200 having different strokes.

The printed circuit board (PCB) 124 is disposed in the actuator 120, and includes a program to control the travel of the transmission 200. Generally, the PCB 124 may be disposed at the base of the actuator 120, but the present invention is not limited thereto. Further, the travel of the transmission 200 may be adjusted by modifying the program included in the PCB 124. Accordingly, one shifting device 100 may be applied in common to transmissions 200 of various types of vehicles.

Furthermore, the control logic of the present invention may be embodied as non-transitory computer readable media on a computer readable medium containing executable program instructions executed by the PCB 124, a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Referring to FIGS. 4 and 5A to 5C, the actuator arm 122 may be provided at the output side of the actuator 120 to thereby improve the operational speed of the cable 50. Further, by designing the actuator 120 to be mounted on a base bracket (not shown) on which a conventional shift lever is installed, the transmission 200 can be operated by using a single actuator 120 in most types of vehicles.

Figure 6:
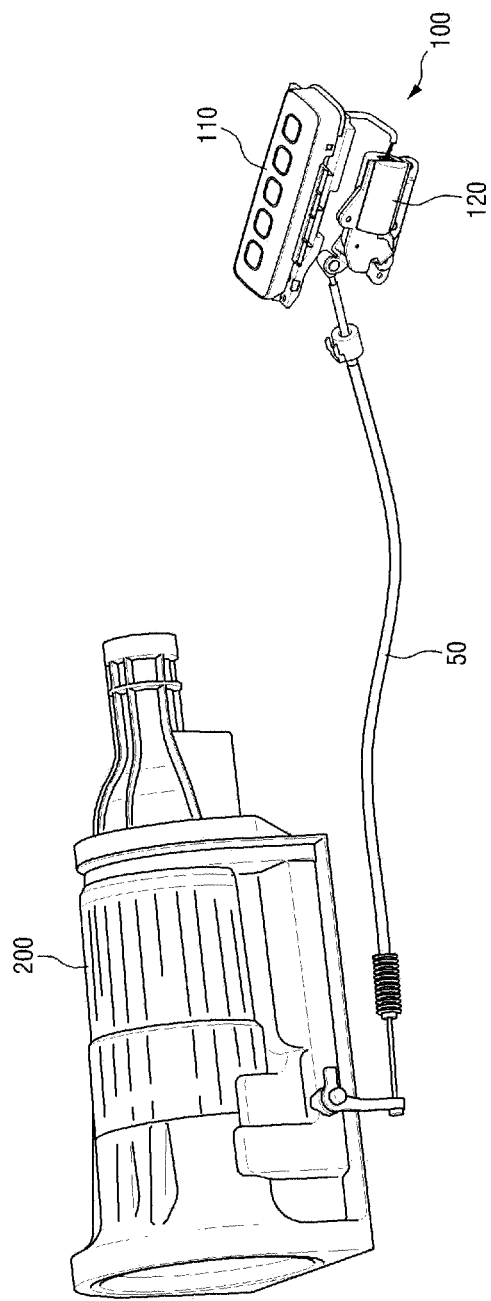
FIG. 6 is a perspective view of a shifting system for a vehicle in accordance with an exemplary embodiment of the present invention.

FIG. 6 is a perspective view of a shifting system for a vehicle in accordance with an embodiment of the present invention. Referring to FIG. 6, the shifting system for a vehicle (hereinafter, referred to as "shifting system") includes the shifting device 100, the transmission 200 and the cable 50. The operation for the gear shift of the vehicle is performed through the shifting device 100, and gears are transitioned/shifted by the transmission 200. The cable 50 mechanically connects the shifting device 100 with the transmission 200, and the shifting device 100 reciprocates the cable 50 based on the shift signal generated in the shifting device 100 according to the gear shift input of the driver, thereby driving the transmission 200. That is, the shifting device 100 is operated by an electrical signal, and the shifting device 100 and the transmission 200 are connected via the cable 50 and operated by a mechanical mechanism.

Further, as described above, the shifting device 100 may include the interface module 110, 111 or 112 for the gear shift input of the driver, and the actuator 120 which operates according to the shift signal transmitted from the interface module 110, 111 or 112. Further, the shifting device 100 may include the communication line 130 which provides a connection between the interface module 110, 111 or 112 and the actuator 120 to allow the transmission of the shift signal, and the connector 140 which connects the communication line 130 with at least one of the interface module 110, 111 or 112 and the actuator 120.

Here, since the interface module 110, 111 or 112 and the actuator 120 of the shifting device 100 perform communication through the communication line 130, no communication is made between the shifting device 10 and the TCU (not shown) of the vehicle. The gear shift input through the interface module 110, 111 or 112 is transmitted to the TCU from an electronic control unit (ECU) using an electrical signal, and the TCU shifts the gear stage of the transmission 200. Accordingly, the communication of the signal is made inside the shifting device 100 itself, and the ECU controls the TCU to perform communication of the signal outside the shifting device 100. Thus, the ECU controls the shifting device 100 and the transmission 200 so that the same position is maintained in the same gear stage between the interface module 110, 111 or 112, the actuator 120 and the transmission 200.

Since the actuator 120 is operated in response to the shift signal transmitted from the interface module 110, 111 or 112 through the communication line 130, various types of the interface modules 110, 111 and 112 may be connected to the actuator 120. For example, as described above, the interface module 110, 111 or 112 may be formed of one of the button type interface module 110, the knob type interface module 111, and the dial type interface module 112. Not to mention that that the present invention may be also applied to other types of interface modules. Further, the actuator 120 may include the actuator arm 122 and the PCB 124. The actuator 120 having the same specification may be applied to various types of transmissions 200 through modifications of the actuator arm 122 and the PCB 124.

The actuator arm 122 is connected to one end of the cable 50, and rotated by the driving force provided from the actuator 120 to reciprocate the cable 50. Further, the PCB 124 includes the program for controlling the travel of the transmission. Specifically, the travel of the transmission 200 is adjusted by adjusting the length of the actuator arm 122 or modifying the program included in the PCB 124. Accordingly, the actuator 120 having the same specification may be applied to almost all cable types of transmissions 200 having different strokes.

When the driver shifts the gear, the actuator 120 receives the shift signal from the interface module 110, 111 or 112 through the communication line 130 to operate the cable 50 connected to the actuator 120, thereby driving the transmission 200. The transmission 200 and the shifting device 100 are connected to each other through the cable 50. Accordingly, a smooth operation feeling can be achieved only by the shifting device 100, and the size of the shifting device 100 can be reduced. Further, the reduction in size of the shifting device 100 results in an increase in space efficiency of the center console. Further, by applying various types of the interface modules 110, 111 and 112 to the shifting device 100, it is possible to provide a gear shift pattern familiar to the customer. In addition, since it is a hybrid mechanism for moving the mechanical cable using the electrical shift signal, it is easy to apply new technology according to the electronization of the vehicle, and it is possible to implement a cost-competitive shifting system for a vehicle.

According to the present invention, the shifting device is mechanically connected to the transmission through the cable, and the cable is connected to the actuator of the shifting device. The actuator is operated based on the shift signal. Accordingly, various types of gear shift input interfaces (button type, joystick type, knob type, etc.) may be applied to the same actuator. Further, since communication of the shift signal is made only in the shifting device and no communication is made with the vehicle system, CAN communication, various determination modes and the like can be omitted, thereby simplifying the vehicle system.

Further, when the driver provides the shift signal, the actuator is operated even through the stroke of the transmission is long. Thus, it is possible to reduce the size of the gate, and facilitate installation of ambient convenient products. Moreover, by modifying the program of the PCB included in the actuator or adjusting the length of the actuator arm, it can be connected to cable types of various transmissions having different strokes, and one shifting device is applicable to various transmissions.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An electronic shifting device for a vehicle, which is connected to a transmission of the vehicle via a cable to operate the transmission, the shifting device comprising:

an interface module operably connected to a first end of a communication line and configured to receive an input of a shift signal and to communicate the shift signal within the shifting device via the communication line; and an actuator operably connected to a second end of the communication line to receive the shift signal from the interface module, the actuator including an actuator arm connected to a first end of the cable opposite a second end of the cable connected to the transmission, wherein the actuator arm actuates the cable to operate the transmission connected to the second end of the cable based on the shift signal input to the communication line by the interface module and received by the actuator within the shifting device, wherein the communication line is contained within the shifting device so that the shift signal is communicated only between the interface module and the actuator within the shifting device and no shift signal is communicated between the shifting device and vehicle system to simplify a vehicle system communication system.

2. The shifting device of claim 1, wherein the interface module is any one of a group consisting of a knob type, a button type and a dial type to receive the input of the shift signal.

3. The shifting device of claim 1, further comprising a connector connecting an end of the communication line with at least one of the interface module and the actuator.

4. The shifting device of claim 1, wherein the actuator arm performs switching rotation.

5. The shifting device of claim 1, wherein the actuator comprises a printed circuit board (PCB) which is disposed in the actuator and includes program instructions from a non-transitory computer readable medium that control operation of the transmission.

\* \* \* \* \*